UNITED STATES PATENT OFFICE.

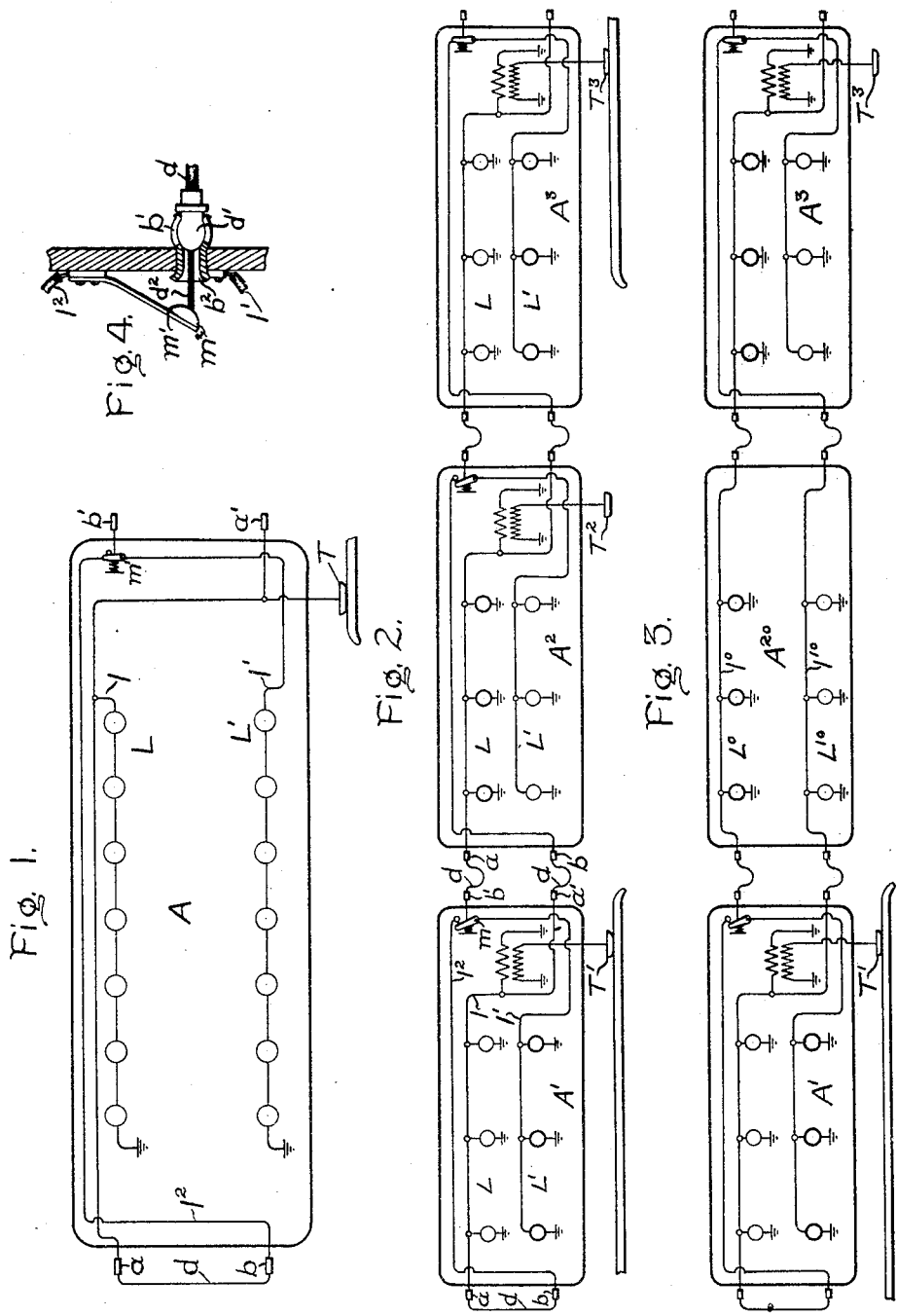

SIGVALD KROHN, OF BERLIN, GERMANY, ASSIGNOR TO GENERAL ELECTRIC COMPANY, A CORPORATION OF NEW YORK.

TRAIN-LIGHTING SYSTEM.

No. 800,376.     Specification of Letters Patent.     Patented Sept. 26, 1905.

Application filed January 21, 1905. Serial No. 242,085.

*To all whom it may concern:*

Be it known that I, SIGVALD KROHN, a subject of the King of Sweden and Norway, residing at Berlin, Germany, have invented certain new and useful Improvements in Train-Lighting Systems, of which the following is a specification.

The present invention relates to electrical train-lighting systems in which lights on one car may receive current from adjacent cars of the train.

If the lights of each car are connected to the local trolley or other source of current-supply, a failure of the trolley to receive current by reason of leaving the third rail or other trolley-conductor, by reason of being insulated therefrom through sleet or dirt, or by reason of coming upon a dead section, will cause the lights of the car to go out, leaving the car in darkness, a situation which is objectionable even if continued for but an instant. This may be prevented by connecting all the lights of a train in a common circuit and feeding current to the lighting-circuit from each of the trolleys of the train. In the latter case failure of any trolley to receive current will not affect the lights, since they will keep on burning as long as any one trolley is receiving current. There is, however, a serious objection to connecting a train-lighting circuit to the several trolleys of the train for the reason that if any trolley fails to receive current the lighting system will feed current back to the motors of the car upon which this trolley is situated, causing the light-circuits to carry motor-current. This is of course dangerous and impracticable.

The object of the present invention is to so arrange the lighting-circuits of a train that a portion at least of the lights upon each car may receive current from the trolleys of a plurality of cars, whereby the failure of the trolley of any one car to supply current does not cause all the lights of any one car to be extinguished.

To the above end the lights of each car are divided into independent groups, which may be connected directly to the local source of current-supply when the car is being operated by itself and one of which may be connected to the source of current-supply of an adjacent car or cars when the car upon which the lights are situated forms part of the train. The apparatus for coupling together the lighting-circuits of several cars is preferably so arranged that when one of the groups of lights is connected to a source of current-supply upon an adjacent car it is automatically disconnected from the local source of current-supply. By this means failure of current upon one car operates to extinguish only a portion of the lights of any one car, although a portion of the lights on several cars may be affected. If each group of lights upon a car is connected to the current-collecting devices of two cars, then both of these cars must fail to receive current before all the lights of these cars are extinguished. Similarly, if the lights are connected to the source of current-supply of more than two cars then all these cars must fail to receive current before all the lights of each car are extinguished. By providing means for disconnecting one group of lights from the local source of current-supply either automatically or otherwise when this group is connected to the source of current-supply of an adjacent car all danger of feeding back current to the motors through the light-circuit is obviated.

One embodiment of the present invention is illustrated in the accompanying drawings, in which—

Figure 1 illustrates diagrammatically a single-car equipment. Fig. 2 illustrates three cars coupled up so as to form a train. Fig. 3 illustrates a train composed of three cars, two of which are motor-cars and the third of which is a trailer arranged between the two motor-cars; and Fig. 4 illustrates a form of switch which may be employed to disconnect automatically one group of lights from the local source of current-supply when it is connected to a source of current from an adjacent car.

Similar reference characters will be used throughout the specification and drawings to indicate like parts.

Reference being had to Fig. 1, A represents a car upon which are located two groups of lights L and L', these groups being arranged in separate circuits $l$ and $l'$, respectively. T is a collecting-shoe or other source of current-supply and, as shown, may be connected permanently to the circuit $l$. $l^2$ is a wire which extends from end to end of the car and is provided at one end with a coupling-socket $b$ and is normally connected at its other end to the lighting-circuit $l'$ by means of the spring-actuated switch $m$. The line $l$ extends throughout the length of the car and is provided at its ends with coupling-sockets $a$ and $a'$, respectively. $d$ is a jumper carrying a conductor and adapted to connect the coupler-socket $b$ to the coupler $a$. The lighting-circuit is now as follows: from trolley T through lights L to ground, and a branch circuit through line $l$, jumper $d$, car-wire $l^2$, switch $m$, lights L' to ground, the two groups of lights being connected in parallel across the line. The lights in this figure are represented as connected for operation on direct current.

In Fig. 2 three similar cars are shown coupled together in the form of a train. Upon car A' the sockets $a$ and $b$ are connected through the jumper, as before, but upon car $A^2$ this connection is omitted and two jumpers $d$ are employed for connecting together, respectively, sockets $b'$ of car A', and socket $a$ of car $A^2$, and socket $a'$ of car A', and socket $b$ of car $A^2$. Similarly, two of these jumpers are employed between cars $A^2$ and $A^3$. The switches $m$ are associated with coupler-socket $b'$ in such a manner that when the jumpers are placed in position the switch is opened, breaking connection between the car-wire $l^2$ and light-circuit $l'$, the jumper, however, serving to connect circuit $l'$ of car A' to circuit $l$ of car $A^2$. Similarly, the circuit $l'$ of car $A^2$ is connected to the circuit $l$ of car $A^3$. It will be noted that current may now pass from trolley $T^2$ upon car $A^2$, through lights L upon car $A^2$ to lighting-circuit $l'$ upon car A', through car-wire $l^2$ upon car $A^3$, and thence through lighting-circuit $l'$ upon car $A^3$. Similarly, the lights L' upon car $A^2$ are supplied with current from trolley $T^3$ upon car $A^3$, and the lights L upon car A' are supplied from trolley T'. If now trolley T' fails to receive current, lights L upon car A' are extinguished, but lights L' are still supplied with current from car $A^2$. Similarly, if trolley $T^3$ does not receive current lights L upon car $A^3$ and lights L' on car $A^2$ are extinguished, the remaining lights, however, still burning. If trolley $T^2$ does not receive current, then half the lights upon each car are extinguished—namely, lights L upon car $A^2$ and lights L' upon cars A' and $A^3$. This latter condition is illustrated in Fig. 2, in which trolleys T' and $T^3$ are shown in engagement with a section of third rail and the trolley $T^2$ is shown isolated from the third rail. It is clear that notwithstanding that one trolley may be deenergized some of the lights at least of each car will remain burning, so that no car is left in entire darkness. In this figure the lights are illustrated as connected in parallel to the lighting-circuits for operation on alternating current.

In Fig. 3 the car $A^{20}$ is a trailer—that is, one not provided with a propelling-motor. The lights $L^0 L^{10}$ are connected to car-wires $l^0 l^{10}$, respectively, the ends of these wires being provided with coupler-sockets corresponding to $a$ and $b$, so that when all the cars are connected by the jumpers $d$ half the lights of each car are supplied with current from trolley T' and the other half from trolley $T^3$. If in this case trolley T' leaves the track or fails to receive current, the lights L upon car A', $L^{10}$ upon car $A^{20}$, and L' upon car $A^3$ are extinguished, while if trolley $T^2$ fails to receive current the other half of the lights are extinguished. In Fig. 3 trolley $T^2$ is shown out of engagement with the third rail, and therefore the lights supplied with current from this trolley are extinguished.

In Fig. 4 there is illustrated a coupler-socket $b'$ and a spring-switch $m$ suitable for use in connection with the present system. The socket $b'$ is of the ordinary bulbous form, composed of a conducting material. The switch $m$ consists of a spring-arm $m'$, carrying the contact-piece $m^2$, which is adapted to make contact with the socket $b'$ at $b^2$. The line $l'$ is connected to the socket $b'$ and the arm $m'$ is connected to line $l^2$. Normally the spring-arm holds the contact $m^2$ in engagement with the coupler-socket, thereby connecting lines $l'$ and $l^2$ together. The jumper $d$ is provided with the usual head $d'$, making electrical connection with the coupler-socket, and is also provided with a stem $d^2$, which is of insulating material. The stem $d^2$ is of sufficient length to engage with the contact-piece $m^2$ and force it outwardly and away from the coupler-socket when the coupler-head $d'$ is placed in position. This arrangement provides for automatically breaking electrical connection between lines $l'$ and $l^2$ the instant the jumper is placed in position, thereby preventing communication from being established between the motors of adjacent cars through the lighting-circuits.

Although I have described the present invention in detail as embodied in one of its forms, I do not desire to limit the present invention to the particular form illustrated, since in its broader aspects it may be embodied in various other forms.

What I claim as new, and desire to secure by Letters Patent of the United States, is—

1. A lighting system comprising a plurality of lamps or groups of lamps upon a car of a train, a source of current-supply upon a plurality of cars of the train, a connection between the lamps or groups of lamps and the local source of current-supply, means for connecting one of said lamps or groups of lamps to the source of current-supply upon another car, and means for automatically disconnecting said lamp or group of lamps from the local source when it is connected to the source upon another car.

2. A train-lighting system comprising a plurality of lamps or groups of lamps upon each of a plurality of cars of a train, means for connecting the lamps of each car to a local source of current-supply, and means for connecting one of the lamps or groups of lamps of each car to a source of current-supply upon another car and for disconnecting it from the local source of current-supply.

3. A train-lighting system comprising a plurality of lamps or groups of lamps upon each of a plurality of cars of a train, means for connecting the lamps of each car to a local source of current-supply, and means for connecting one lamp or group of lamps upon each car to a source of current-supply upon another car for automatically disconnecting said lamp or groups of lamps from the local source of current-supply.

4. A train-lighting system comprising a plurality of lamps or groups of lamps upon each of a plurality of cars of a train, current-collecting devices carried by a plurality of cars, and means for connecting the lamps or groups of lamps of each car to separate current-collecting devices.

In witness whereof I have hereunto set my hand this 31st day of December, 1904.

SIGVALD KROHN.

Witnesses:
WOLDEMAR HAUPT,
HENRY HASPER.